United States Patent
Schwinning

(10) Patent No.: US 8,523,110 B2
(45) Date of Patent: Sep. 3, 2013

(54) DOOR FRAME COMPONENT OF CAST TITANIUM AND STRUCTURAL FUSELAGE PART

(75) Inventor: Melanie Schwinning, Boernsen (DE)

(73) Assignee: AIRBUS Operations GmbH, Hamburg (DE)

( * ) Notice: Subject to any disclaimer, the term of this patent is extended or adjusted under 35 U.S.C. 154(b) by 804 days.

(21) Appl. No.: 12/058,626

(22) Filed: Mar. 28, 2008

(65) Prior Publication Data

US 2009/0146008 A1      Jun. 11, 2009

Related U.S. Application Data

(60) Provisional application No. 60/908,592, filed on Mar. 28, 2007.

(51) Int. Cl.
    *B64C 1/14*     (2006.01)
(52) U.S. Cl.
    USPC ........................................ 244/119; 244/129.4
(58) Field of Classification Search
    USPC .......... 244/119, 129.1, 129.4, 129.5; 49/504;
                  52/196, 204.1, 245, 246, 247
    See application file for complete search history.

(56) References Cited

U.S. PATENT DOCUMENTS

| | | | | |
|---|---|---|---|---|
| 2,445,131 A * | 7/1948 | Wartian | ...................... | 244/129.5 |
| 3,434,256 A * | 3/1969 | Eggert, Jr. | ..................... | 52/204.1 |
| 4,067,157 A * | 1/1978 | Robinson | ..................... | 52/127.2 |
| 5,014,934 A * | 5/1991 | McClaflin | ..................... | 244/132 |
| 5,201,831 A * | 4/1993 | Higgins et al. | ................. | 244/119 |
| 5,259,576 A * | 11/1993 | Howard | ...................... | 244/129.5 |
| 5,520,358 A * | 5/1996 | Kahn et al. | ................... | 244/129.5 |
| 5,619,823 A * | 4/1997 | Ruff et al. | ......................... | 49/504 |
| 5,673,874 A * | 10/1997 | Howard | ..................... | 244/129.5 |
| 5,849,393 A * | 12/1998 | Slattery | ......................... | 428/172 |
| 6,443,392 B2 * | 9/2002 | Weber et al. | ............... | 244/117 R |
| 7,290,736 B2 * | 11/2007 | Pahl | ............................ | 244/129.5 |
| 7,530,531 B2 * | 5/2009 | Wood et al. | ................. | 244/129.3 |
| 2001/0025903 A1* | 10/2001 | Weber et al. | ................ | 244/129.5 |
| 2005/0067527 A1* | 3/2005 | Petersen | .................... | 244/17.11 |
| 2005/0133667 A1* | 6/2005 | Pahl | ............................. | 244/129.5 |
| 2006/0071125 A1* | 4/2006 | Wood et al. | .................... | 244/119 |
| 2006/0096192 A1* | 5/2006 | Daudet | ......................... | 52/204.1 |
| 2007/0007390 A1 | 1/2007 | Doerer | | |
| 2007/0176048 A1* | 8/2007 | Huber et al. | .................. | 244/119 |
| 2008/0164373 A1* | 7/2008 | Roming | .................... | 244/129.5 |

FOREIGN PATENT DOCUMENTS

DE    600 29 963 T2    2/2007
DE    102007015007 A1 *    10/2008

OTHER PUBLICATIONS

German Office Action, German Application No. 10 2007 015 007.7, Oct. 12, 2011, 16 pages.

* cited by examiner

*Primary Examiner* — Joseph W Sanderson
(74) *Attorney, Agent, or Firm* — Fenwick & West LLP

(57) ABSTRACT

A door frame component of cast titanium for a door opening in an outer skin of an aircraft or space vehicle and a structural fuselage part that includes the door frame component. The component includes a contact surface for bearing against the outer skin formed to correspond to an inner contour of the outer skin, The structural part includes the door frame component and an outer skin of a carbon fiber reinforced plastic material.

16 Claims, 5 Drawing Sheets

DOOR FRAME COMPONENT OF CAST TITANIUM AND STRUCTURAL FUSELAGE PART

CROSS-REFERENCE TO RELATED APPLICATIONS

This application claims the benefit of U.S. Provisional Application No. 60/908,592, filed Mar. 28, 2007, the entire disclosure of which is herein incorporated by reference.

FIELD OF THE INVENTION

This invention relates to a door frame component for an air or space vehicle, and a structural fuselage part with such a door frame component.

BACKGROUND OF THE INVENTION

Although it can be used on any door openings in lightweight structures, this invention and the problems on which it is based are explained in relation to a passenger door in the fuselage shell of an aircraft.

Fuselage shells for aircraft are normally produced in so-called lightweight design from an outer skin which is reinforced on the inside by a two-dimensional structure of stringers running in the longitudinal direction of the aircraft and ribs running transversely to the longitudinal direction of the aircraft as stiffening elements.

In order to provide a door opening that can be sealed by a door in such a fuselage shell, it is necessary to reinforce the edge of the door opening with a suitable door frame which meets a plurality of functional requirements. Firstly the door frame performs the structural function of the outer skin section recessed to form the door opening and of the stiffening elements running on its inside and interrupted by the door opening, so that the stiffness of the fuselage shell is not impaired by the provision of the door opening.

Secondly the door frame generally supports hinge elements for the movable suspension of a door in the door opening and locking elements with which the door can be locked to seal the door opening. For this purpose it is necessary to design the door frame so that it is able to support the weight of the door in any opening condition and absorb the forces generated during opening, closing and locking and/or deflect them to the surrounding fuselage structure. A further requirement of the door frame is that it resists mechanical loads, e.g. impacts when passengers embark and disembark or during loading and unloading of the aircraft, so that no damage occurs to the door frame itself or to the surrounding outer skin.

Aluminum and aluminum alloys have been used for decades as the conventional material for the outer skin, stringers and ribs, as well as for the door frame structures. However, they are being replaced to an increasing extent in aircraft construction by composite fiber materials, in particular by carbon fiber reinforced plastic (CFP), since a lower total weight of the aircraft, and hence lower energy consumption in flight operation, can achieved thereby whilst retaining the same strength and stiffness of the aircraft fuselage. Further advantages of the composite fiber materials relative to aluminum materials are low material fatigue and the absence of corrosion.

However, in order to process composite fiber materials techniques are required which are often distinguished essentially from the techniques used to process aluminum materials. For example, door frame parts can be produced from aluminum by cutting solids aluminum semi-finished products. However, specially shaped laminating devices must be supplied for manufacturing suitable parts from carbon fiber reinforced plastic, in which devices fiber structures can be draped and laminated with epoxy resin in the required target shape. Generally speaking, both the production and the assembly of such CFP components are far more time-consuming and hence more expensive than for corresponding conventional aluminum components. Moreover, complexly shaped components of CFP, in particular, are difficult to repair or cannot be repaired at all, which represents a considerable disadvantage in the case of door frame parts which are subject to continuous risk of damage during operation.

In a conceivable combination of aluminum and CFP components, e.g. a door frame of an aluminum alloy and an outer skin of CFP, the problem arises, on the other hand, that between aluminum and carbon fiber reinforced plastic there is an electrochemical potential which results in corrosion on the part of the aluminum when the two materials come into contact with each other. An expensive insulation by intermediate layers of non-conducting materials is therefore required, which increases the production costs and the total weight of the aircraft.

SUMMARY OF THE INVENTION

It is therefore an object of this invention to provide a door frame component at low production costs and low weight which can be used in combination with fuselage structures of carbon reinforced plastic, and, in particular, to provide a door frame component which is easy to repair.

The idea on which this invention is based is that the door frame component is produced from cast titanium and has a contact surface for bearing against the outer skin of an aircraft or space vehicle. In this case the contact surface is formed so that it essentially fills an inner contour of the outer skin, i.e. lies essentially flush with the inside of the outer skin without interval when it is applied to it during assembly.

The use of titanium provides good compatibility with CFP so that the door frame component can be used without insulating intermediate layers with direct contact of the contact surface with the outer skin, even though the outer skin consists of carbon fiber reinforced plastic. If a casting method is used for manufacture instead of the milling method used in conventional aluminum parts, since the high material consumption and tool wear that otherwise occur during cutting machining of solid titanium blocks are avoided.

The casting method enables the door frame part to be supplied with a high surface quality, particularly of the contact surface. This high surface quality is achieved without expensive mechanical re-machining processes. Furthermore, since the casting method enables the inner contour of the outer skin to be re-shaped extremely precisely with steps, thickenings, etc., without burrs being formed, as in the milling process, or without the geometry of the milling cutter limiting the achievable radii and formable contours, the contact surface lies particularly flush to the outer skin during assembly. This results in greater stability and endurance of the whole structure.

It is also an advantage that smaller wall thicknesses can be achieved compared to cutting machining, as in the case of conventional aluminum parts, and that there is a greater freedom of design in terms of shape, e.g. because undercuts are possible which cannot be achieved in milling and cutting processes. This enables the mechanical strength of titanium, which is greater than that of aluminum, to be converted to a lower weight of the door frame component by correspondingly reducing the wall thickness of sections of the door frame part, for example, whilst retaining the same level of stability.

Since the cast titanium door frame component can be mounted directly on the fuselage structure, even if it consists of carbon fiber reinforced plastic, no complex assembly equipment is required, which results in a saving in time and cost in assembly. The final machining and delivery of a product ready for installation may be transferred, for example, to a supplier company, resulting in a further cost saving in production and structure assembly.

According to one embodiment of the invention, at least one hinge portion (hinge fastening portion) is provided for movable suspension of a door in the door opening. The integral fastening portion of the hinge on the casting provides greater stability and/or reduced weight compared with conventional door frames with separately secured hinges.

According to a further embodiment, at least one locking portion (locking fastening portion) is provided for locking a door in the door opening. As with the hinge portion, this increases stability and/or reduces weight.

According to another embodiment, a door frame rib is provided for arrangement on one side of the door opening, the door frame rib having a length which is at least as great as one height of the door opening. For example, the door frame section may include only the door frame rib or the door frame rib as part of a larger casting with further formed portions. Because the door frame rib extends over at least the entire height of the door opening, it stabilises it considerably.

The door frame rib may have an essentially C-shaped profile with two legs and one transverse wall connecting the legs. Such a hollow profile is characterised by high stiffness with low weight. Here the contact surface is preferably formed on one outer side of one of the legs of the C-shaped profile, so that, in particular, one outside of the transverse wall points towards the door opening when the contact surface rests on the inner contour of the outer skin. In this manner the door frame section faces the door opening with an essentially flat surface which is resistant to damage, whilst the leg which does not touch the outer skin can be used, for example, to suspend an inner fairing of the aircraft or space vehicle.

According to another embodiment, at least one web, which connects the legs and the transverse wall together, is formed between the legs. This results in the formation of additionally stabilising partitions in the cavity between the legs. In particular, the at least one web runs essentially perpendicularly to the transverse wall and/or the legs. Obliquely running webs with undercuts are also easy to achieve by means of the casting method.

According to a further embodiment, the door frame rib has at least one intercostal portion for supporting in an intercostals region of the outer skin located between the door frame rib and an adjacent rib of the aircraft or space vehicle. Because of the support the door frame section is able to deflect mechanical loads generated by the weight of the door or impacts, for example, to a larger area of the outer skin. Since these are portions formed by the casting (i.e. formations of the casting), they can be constructed in a particularly lightweight design without the additional weight of assembly parts or without overlapping surfaces of otherwise necessary separate parts with the same stability. The intercostal portion preferably extends in this case essentially perpendicularly to the transverse wall so that a maximum support effect is obtained. On the other hand, obliquely formed intercostal portions are easy to achieve by means of the casting method to meet the design requirements of the aircraft or space vehicle.

According to one embodiment, the intercostal portion has a fastening portion for fastening to an adjacent rib of the aircraft or space vehicle. This enables forces that are generated to be deflected not only to the outer skin but also directly to the immediately adjacent rib. Since the entire casting consist of titanium, this is possible in direct contact even when the adjacent rib consists of CFP.

According to another embodiment, a door frame beam is provided for arrangement on an upper edge of the door opening, the door frame beam having a length which is at least as large as one width of the door opening. The upper edge of the door opening may therefore also be correspondingly and advantageously reinforced to the same degree as the lateral edges. In this case the door frame section may comprise both exclusively the door frame beam and a combined casting of door frame beam and door frame rib, for example.

According to a further embodiment, a door frame thresholds is provided for arrangement on a lower edge of the door opening, the door frame threshold having a length which is at least as large as one width of the door opening. In this manner the lower edge of the door opening may also be correspondingly and advantageously reinforced. Here the door frame section may include both exclusively the door frame threshold and, for example, a combined casting, which comprises one complete, integrally formed door frame with extremely high stability and dimensional accuracy.

From another viewpoint the invention makes available a structural fuselage part for an aircraft or space vehicle which comprises an outer skin which has a carbon fiber reinforced plastic material together with a door frame component according to one of the above developments.

BRIEF DESCRIPTION OF THE DRAWINGS

The present invention is explained in more detail below using preferred exemplary embodiments and with reference to the attached figures of the drawings, in which.

In the figures the same reference symbols denote the same or functionally similar components, unless otherwise indicated.

DETAILED DESCRIPTION OF THE INVENTION

Figure 1:
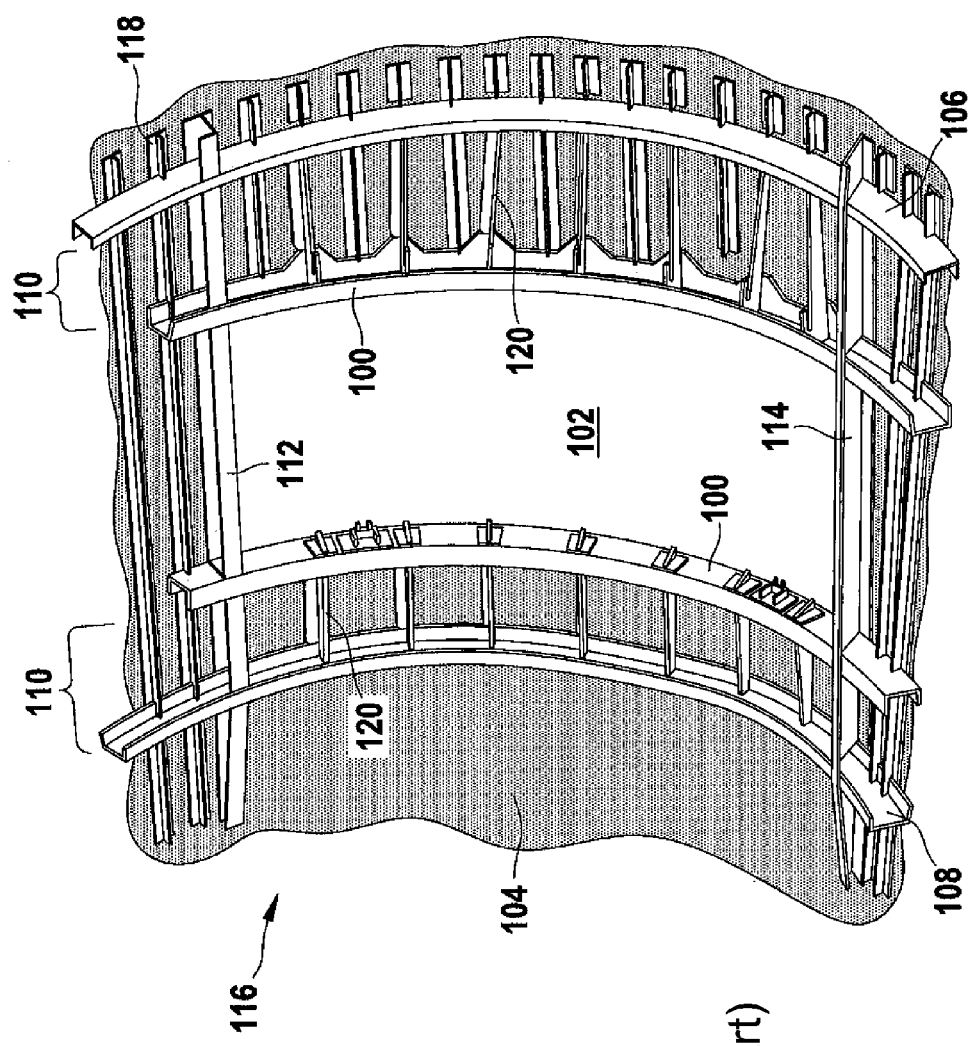
FIG. 1 shows a sectional inside view of an example of an aircraft fuselage structure with a door opening.

FIG. 1 shows a sectional inside view of an example of an aircraft fuselage structure with a door opening 102. What is represented is a section of fuselage shell 16 with an outer skin 104, which is interrupted in the centre of the section shown by door opening 102. Simply for a clearer understanding of the course of outer skin 104 and the position of door opening 102, the outer skin is highlighted in the drawing by a dotted line. Stringers 118 and ribs 106, 108 run on the inside of the outer skin, the course of some of stringers 118, whose distance from each other is small compared to the height of door opening 102, is interrupted by door opening 102. (In the region shown in FIG. 1 to the left of door opening 102, the stringers are not shown for the sake of clarity). Since the width of door opening 102 is smaller than the distance between ribs 106, 108, and the door opening is also arranged in the region between ribs 106, 108, these are not interrupted by door opening 102.

On both sides of door opening 102 are arranged door frame ribs 100, which run parallel with the regular ribs 106 and which extend on the edge of door opening 102 throughout its height and continue to both ends for a small section beyond door opening 102 in proportion to the height of door opening 102. A door frame beam 112 running along an upper edge of door opening 102 and a door threshold 114 running along the lower edge of door opening 102 form a frame structure enclosing door opening 102 together with the door frame ribs 100.

In the intercostals regions between one of door frame ribs 100 and the closest adjacent regular rib 106 and 108 respectively are arranged intercostals webs 120 which are rigidly connected to each door frame rib 100 and serve to deflect forces applied to door frame ribs 100 to outer skin 104. The ends of intercostals webs facing away from door frame ribs 100 are also connected to the adjacent regular rib 106 and 108 respectively, so that forces can also be deflected into them.

Figure 2:
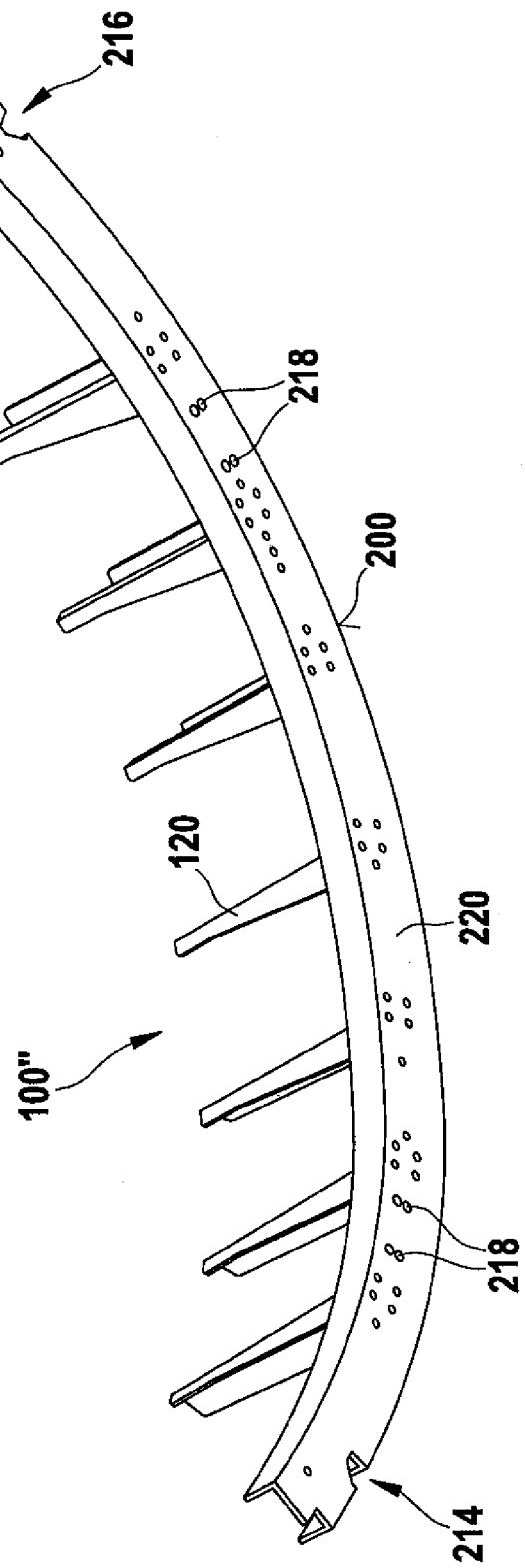
FIG. 2 shows a perspective view of a door frame component for a door opening in a fuselage structure.
Figure 3:
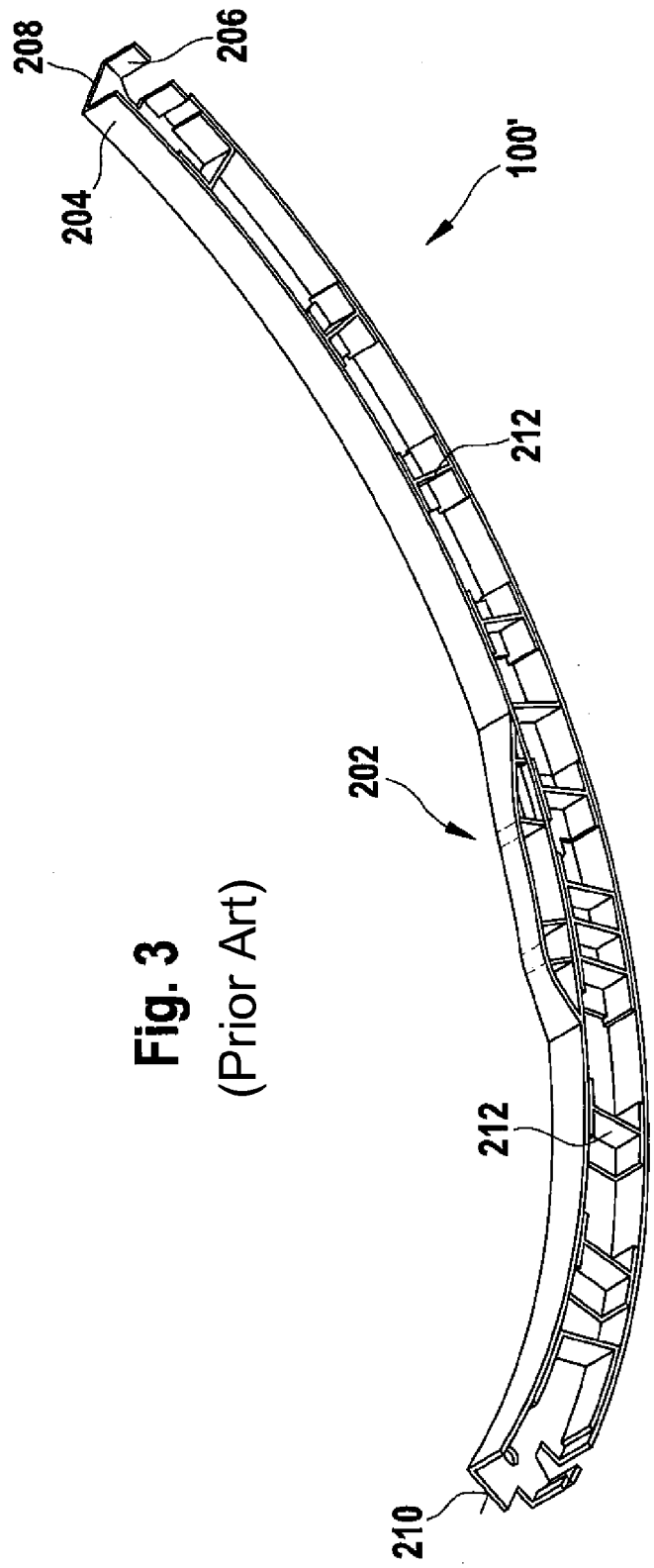
FIG. 3 shows a perspective view of a further door frame component for a door opening in a fuselage structure.

FIGS. 2 and 3 show perspective views of each of door frame ribs 100', 100" of the conventional type for a door opening in a fuselage structure, as shown in FIG. 1. Both door frame ribs 100', 100" are produced as aluminum cuttings and are bent according to the curvature of the outer wall of the aircraft fuselage. They have essentially a C-shaped profile with two legs 204, 206 and a transverse wall 208 connecting the legs, one of legs 206 being arranged with its outer side 200 bearing against the inside of the outer wall of the fuselage structure and orientated so that transverse wall 208 faces the door opening with its outer side 210. Here insulating layers of glass fiber reinforced plastic, for example, are inserted between leg 106 and the outer wall in the case of an outer wall of CFP, which layers are not shown here. Recesses 214, 216 serve to fasten the door frame threshold and the door frame beam to door frame ribs 100, 100".

Door frame rib 100" shown in FIG. 2 shows set sets of fastening holes 218 for fastening hinges in which a door sealing the door opening is to be suspended. Rivets, by means of which intercostal webs 120 are fastened to door frame rib 100", are passed through further fastening holes 220.

Door frame rib 100' shown in FIG. 3 has a locking unit 202 for locking the door, which unit can be secured to door frame rib 100' by rivets, for example. Webs 212, which connect legs 204, 206 and transverse wall 208 of the profile, thereby stiffening the profile, are arranged inside the C-shaped profile. Because of the limited possibilities of the cutting method used to producing of door frame rib 100', webs 212 are not worked from the same block of aluminum, but are inserted in it as separate parts and are fastened with rivets by means of surface regions visibly overlapping legs 204, 206 and transverse wall 208.

Figure 4:
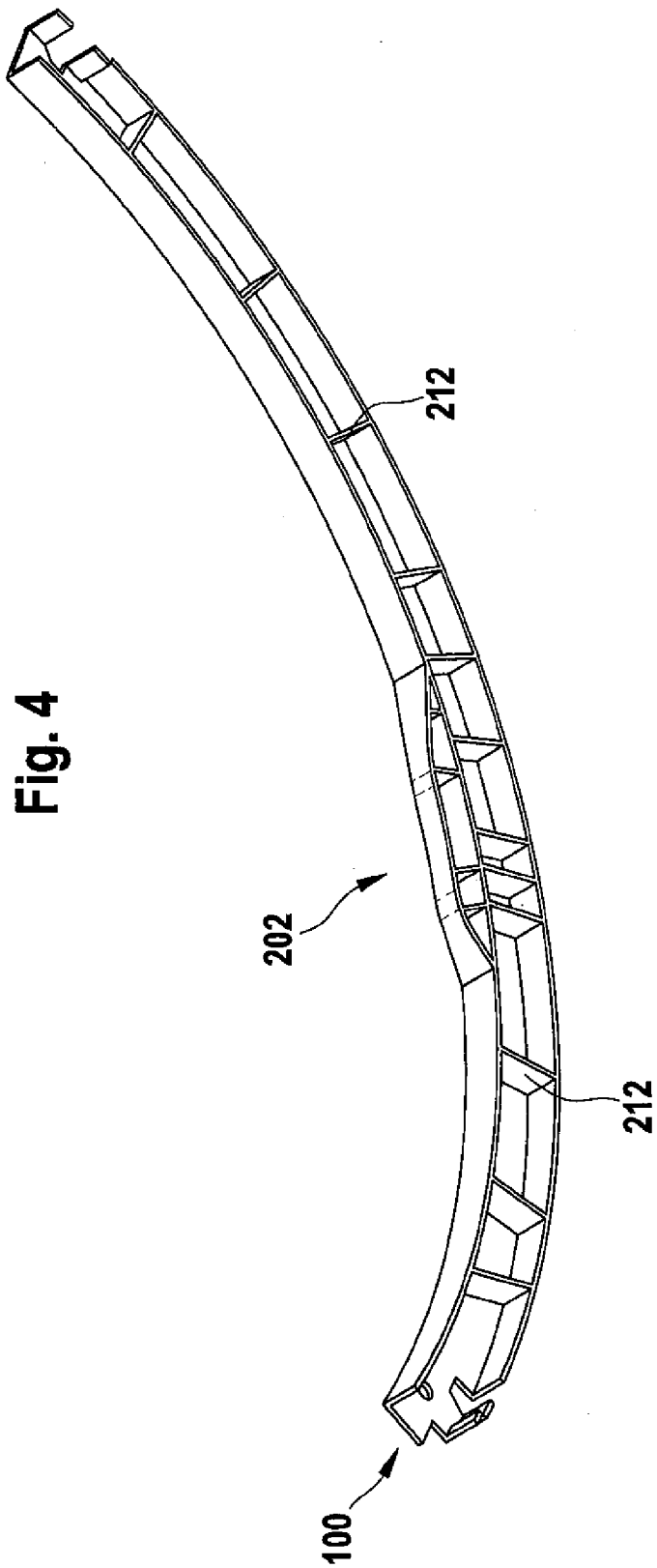
FIG. 4 shows a perspective view of a door frame component of cast titanium according to a first embodiment of this invention.

FIG. 4 shows a perspective view of a door frame rib 100 of cast titanium, which represents a door frame component 100 according to a first embodiment of this invention. The door frame rib 100, shown in FIG. 4, may be used as part of a fuselage structure such as that shown in FIG. 1, just as the door frame rib 100' shown in FIG. 3 may be used in the fuselage structure. Webs 212, which, unlike the conventional door frame rib, are constructed as formations of a single casting 100, are arranged inside the profile of door frame rib 100, also C-shaped. Accordingly, no overlapping surface regions or rivets are required for fastening. A locking unit 202 is also constructed as a formation of casting 100. Because of the higher strength of titanium relative to aluminum, and because of the greater design possibilities offered by the casting method, wall thicknesses is generally smaller than in the case of door frame rib 100' sown in FIG. 3, so that the total weight is reduced relative to the latter. In the assembly, e.g. in the fuselage structure shown in FIG. 1, for example, insulating layers on the outer skin may be dispensed with.

The titanium alloy GF—TiA16V4 may, for example, be used to produce the casting. Shrink holes produced during casting may be closed by hot isostatic pressing, and the surface quality may be improved by chemical post-treating.

Figure 5:
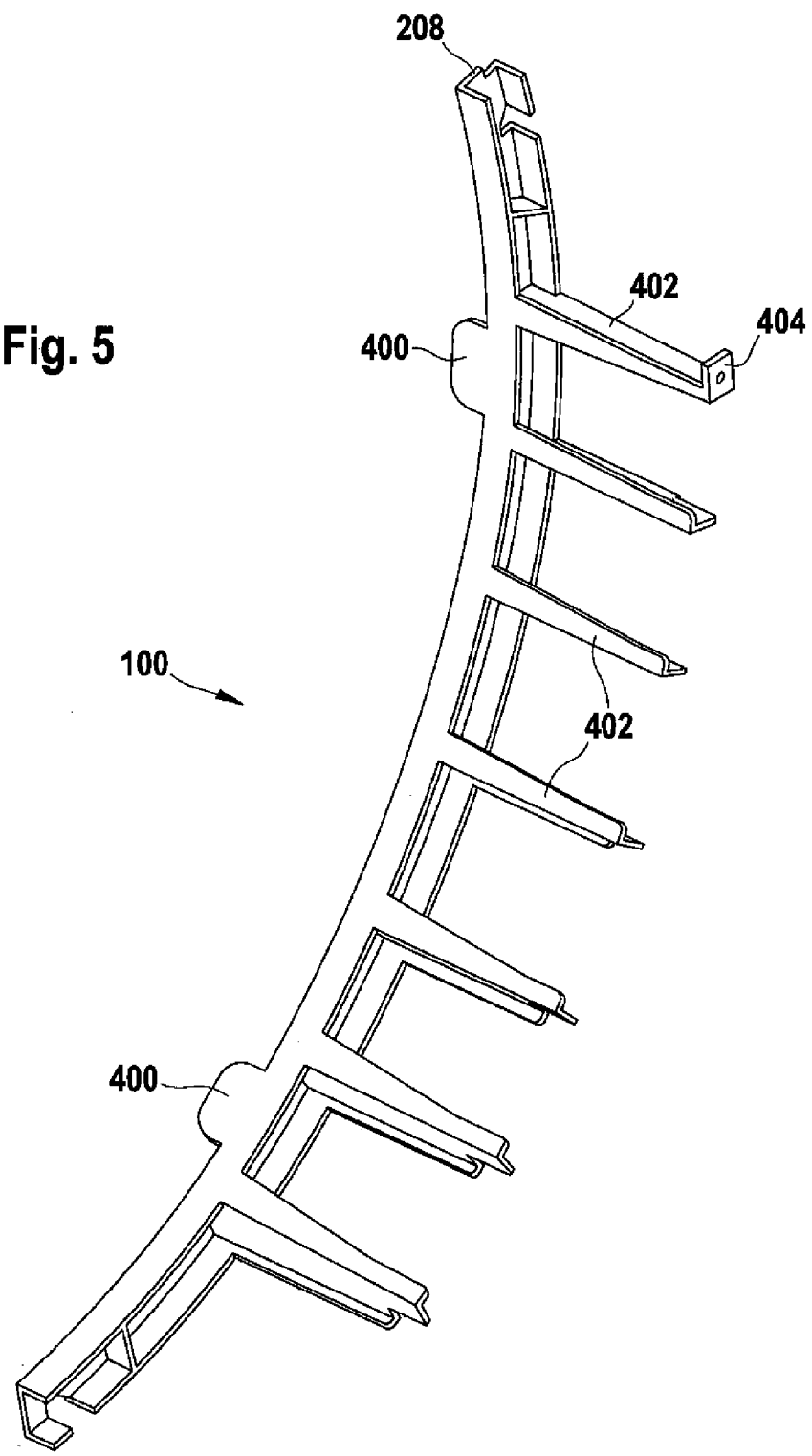
FIG. 5 shows a perspective view of a door frame component of cast titanium according to a second embodiment of this invention.

FIG. 5 shows a perspective view of a door frame component 100 of cast titanium according to a second embodiment of this invention. Door frame component 100 shown comprises both a door frame rib and intercostal portions 402 formed on it, which formations take the place of the separate intercostals webs 120 shown in FIGS. 1 and 2. One of intercostal portions 402 has on its end a fastening portion 404 for fastening to the closest adjacent rib. Furthermore, hinge portions 400 of casting 100 eliminate the need for separately secured hinges for fastening a door.

Although this invention has been described above with reference to preferred exemplary embodiments, it is not limited to them but can be modified in a multitude of ways.

For example, the invention may also be applied to a freight or baggage door in which the hinges, for example, can be arranged on the upper or lower side of the door opening. The function of one or both door frame ribs can also be performed by a regular rib in a suitable arrangement of the regular ribs.

What is claimed is:

1. A door frame system for a door opening in an outer skin of an aircraft or space vehicle, the door frame system comprising:
   a door frame component comprising a contact surface for bearing against the outer skin of the aircraft or space vehicle,
   wherein the door frame component is a single casting of a titanium alloy,
   wherein the door frame component contact surface is formed to lay flush with an inside of the outer skin,
   wherein the door frame component is mounted directly to the outer skin, and
   wherein the outer skin comprises of a carbon fiber reinforced plastic composite.

2. The door frame system according to claim 1, wherein the door frame component comprises at least one hinge portion for movable suspension of a door in the door opening.

3. The door frame system according to claim 1, wherein the door frame component comprises at least one locking portion for locking a door in the door opening.

4. The door frame system according to claim 1, wherein the door frame component comprises a door frame rib for arrangement on one side of the door opening, and the door frame rib is at least as long as the door opening is high.

5. The door frame system according to claim 4, wherein the door frame rib has a C-shaped profile, the C-shaped profile comprised of two legs and a transverse wall connecting the two legs.

6. The door frame system according to claim 5, wherein the contact surface is arranged on an outer side of one of the legs of the C-shaped profile.

7. The door frame system according to claim 6, wherein the transverse wall of the C-shaped profile faces the door opening.

8. The door frame system according to claim 5, further comprising at least one web connecting the two legs and the transverse wall together.

9. The door frame system according to claim 8 wherein the at least one web runs perpendicularly to the transverse wall, and the two legs.

10. The door frame system according to claim 4, wherein the door frame component comprises at least one intercostal portion for support in an intercostal region of the outer skin located between the door frame component and an adjacent rib of the aircraft or space vehicle.

11. The door frame system according to claim 10, wherein the intercostal portion extends perpendicularly to the transverse wall.

12. The door frame system according to claim 11, wherein the intercostal portion has a fastening portion for fastening to an adjacent rib of the aircraft or space vehicle.

13. The door frame system according to claim 1, wherein the door frame component is provided for arrangement on an upper edge of the door opening, wherein a length of the door frame component is equal to a height of the door opening.

14. The door frame system according to claim 1, wherein the door frame component is provided for arrangement on a lower edge of the door opening, wherein the length of the door frame component is equal to a height of the door opening.

15. A fuselage structure part for an aircraft or space vehicle, the fuselage structure part comprising:

an outer skin, which comprises a carbon fiber reinforced plastic material; and a door frame component for a door opening in the outer skin, wherein the door frame component comprises a contact surface for bearing against the outer skin, and wherein the contact surface is formed to lay flush with an inside of the outer skin, wherein the door frame component comprises of a single casting of a titanium alloy, wherein the door frame is mounted directly on the outer skin, wherein the door frame component further comprises intercostal portions; and wherein the intercostal portions have on their ends a fastening portion for fastening to a closest adjacent rib.

16. The fuselage structure part for an aircraft or space vehicle according to claim 15, wherein the fuselage structure part further comprises:

ribs for stiffening the outer skin, and wherein the ribs comprise a carbon fiber reinforced plastic material; and wherein the intercostal portions of the door frame component are fastened to the ribs by the fastening portions.

* * * * *